(12) United States Patent
Suita

(10) Patent No.: US 11,858,298 B2
(45) Date of Patent: Jan. 2, 2024

(54) TIRE

(71) Applicant: Toyo Tire Corporation, Itami (JP)

(72) Inventor: Harunobu Suita, Itami (JP)

(73) Assignee: Toyo Tire Corporation, Itami (JP)

( * ) Notice: Subject to any disclaimer, the term of this patent is extended or adjusted under 35 U.S.C. 154(b) by 0 days.

(21) Appl. No.: 17/512,287

(22) Filed: Oct. 27, 2021

(65) Prior Publication Data

US 2022/0126634 A1     Apr. 28, 2022

(30) Foreign Application Priority Data

Oct. 27, 2020  (JP) ................................ 2020-179382

(51) Int. Cl.
*B60C 15/06*     (2006.01)
*B60C 19/00*     (2006.01)

(52) U.S. Cl.
CPC .. *B60C 15/0628* (2013.01); *B60C 2015/0614* (2013.01); *B60C 2015/0617* (2013.01); *B60C 2015/0621* (2013.01); *B60C 2015/0625* (2013.01); *B60C 2015/0639* (2013.01); *B60C 2019/004* (2013.01)

(58) Field of Classification Search
CPC .... B60C 2015/0617; B60C 2015/0621; B60C 2015/0625; B60C 15/06; B60C 2015/0614
See application file for complete search history.

(56) References Cited

U.S. PATENT DOCUMENTS

| | | | | |
|---|---|---|---|---|
| 2004/0123927 | A1* | 7/2004 | Ueyoko | B60C 15/0607 152/451 |
| 2008/0289736 | A1* | 11/2008 | Adamson | B60C 23/0493 156/110.1 |
| 2016/0303921 | A1* | 10/2016 | Miklic | B60C 13/00 |
| 2017/0021679 | A1* | 1/2017 | Wang | B60C 15/0009 |
| 2018/0105612 | A1* | 4/2018 | Miyasaka | C08K 5/175 |
| 2019/0359011 | A1* | 11/2019 | Tauchi | B60C 15/0628 |
| 2020/0108676 | A1 | 4/2020 | Suita | |
| 2020/0247193 | A1* | 8/2020 | Nakajima | B60C 15/06 |

(Continued)

FOREIGN PATENT DOCUMENTS

| | | | | |
|---|---|---|---|---|
| JP | 2002178724 | A * | 6/2002 | ........ B60C 15/0607 |
| JP | 2004106796 | A * | 4/2004 | |

(Continued)

OTHER PUBLICATIONS

Machine Translation: JP-2009227236-A, Ito K, (Year: 2022).*

(Continued)

*Primary Examiner* — Kendra Ly
(74) *Attorney, Agent, or Firm* — Maier & Maier, PLLC

(57) ABSTRACT

A tire includes: a pair of beads having bead cores and a bead filler extending to an outer side in a tire-radial direction of the bead core; a carcass ply extending from one of the bead core of one bead to the bead core of the other bead, and folded back around each of the bead cores; a first pad disposed at an outer side in a tire-width direction of a folding end of the carcass ply which is folded back; a second pad disposed at an outer side in the tire-width direction of the first pad; and rim strip rubber disposed at least at a part on an outer side in the tire-width direction of the second pad, in which an electronic component is provided to interpose the second pad and the rim strip rubber.

15 Claims, 5 Drawing Sheets

(56) References Cited

U.S. PATENT DOCUMENTS

2021/0070110 A1  3/2021  Joulin et al.
2021/0252815 A1  8/2021  Bestgen et al.

FOREIGN PATENT DOCUMENTS

| JP | 2009227236 A | * | 10/2009 |
| JP | 2011105076 A | * | 6/2011 |
| JP | 6276859 B2 | | 2/2018 |
| WO | 2015/088890 A1 | | 6/2015 |
| WO | 2019180358 A1 | | 9/2019 |
| WO | 2019220063 A2 | | 11/2019 |

OTHER PUBLICATIONS

Machine Translation: JP-2002178724-A, Mizuno Y, (Year: 2023).*
Machine Translation: JP-2004106796-A, Ota T, (Year: 2023).*
Machine Translation: JP-2011105076-A, Niizuma N, (Year: 2023).*

* cited by examiner

TIRE

This application is based on and claims the benefit of priority from Japanese Patent Application 2020-179382, filed on 27 Oct. 2020, the content of which is incorporated herein by reference.

FIELD

The present invention relates to a tire in which an electronic component is embedded.

BACKGROUND

Conventionally, tires in which an electric component such as RFID is embedded within the rubber structure have been known. With such tires, by an RFID tag embedded in the tire and a reader as an external device carrying out communication, it is possible to perform production control of tires, usage history management, etc. For example, Japanese Patent No. 6276859 shows a tire in which an electronic component serving as an RFID tag is arranged at a boundary surface between a reinforcement filler covering a folding end of a ply surrounding a bead filler from outside, and a rubber component (wear part) covering the reinforcement filler from outside.

SUMMARY

In the technology shown in Japanese Patent No. 6276859, the electronic component is susceptible to the influence of the ply, due to being a configuration in which a reinforcement filler is arranged as a single-layer member between the electronic component and ply.

The present invention has been made taking account of the above issue, and an object thereof is to provide a tire which can achieve an improvement in layout precision, by arranging an electronic component so as to hardly receive influence from the ply.

(1) The tire of the present invention includes: a pair of beads having a pair of annular bead cores arranged to be separated in the tire-width direction and a bead filler extending to an outer side in a tire-radial direction of the bead core; a carcass ply extending from one of the bead cores to another of the bead cores, and folded back around each of the bead cores; a first pad disposed at an outer side in a tire-width direction of a folding end of the carcass ply which is folded back; a second pad disposed at an outer side in the tire-width direction of the first pad; and rim strip rubber disposed at least at a part on an outer side in the tire-width direction of the second pad, in which an electronic component is provided to interpose the second pad and the rim strip rubber.

According to the present invention, it is possible to provide a tire which can achieve an improvement in layout precision, by arranging an electronic component so as to hardly receive influence from the ply.

DETAILED DESCRIPTION OF THE EMBODIMENTS

Figure 1:
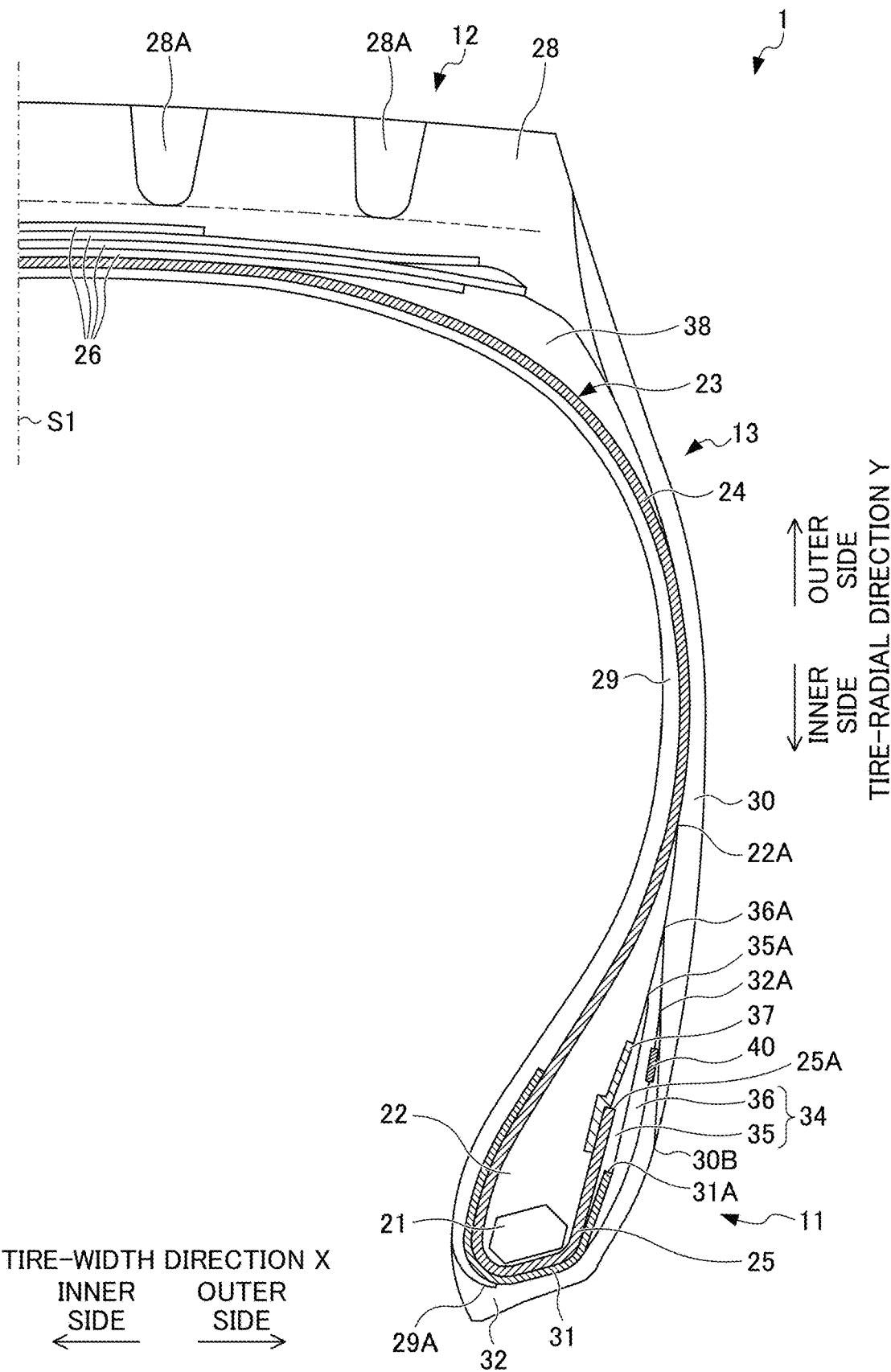
FIG. 1 is a view showing a half section in a tire-width direction of a tire according to an embodiment of the present invention.
Figure 2:
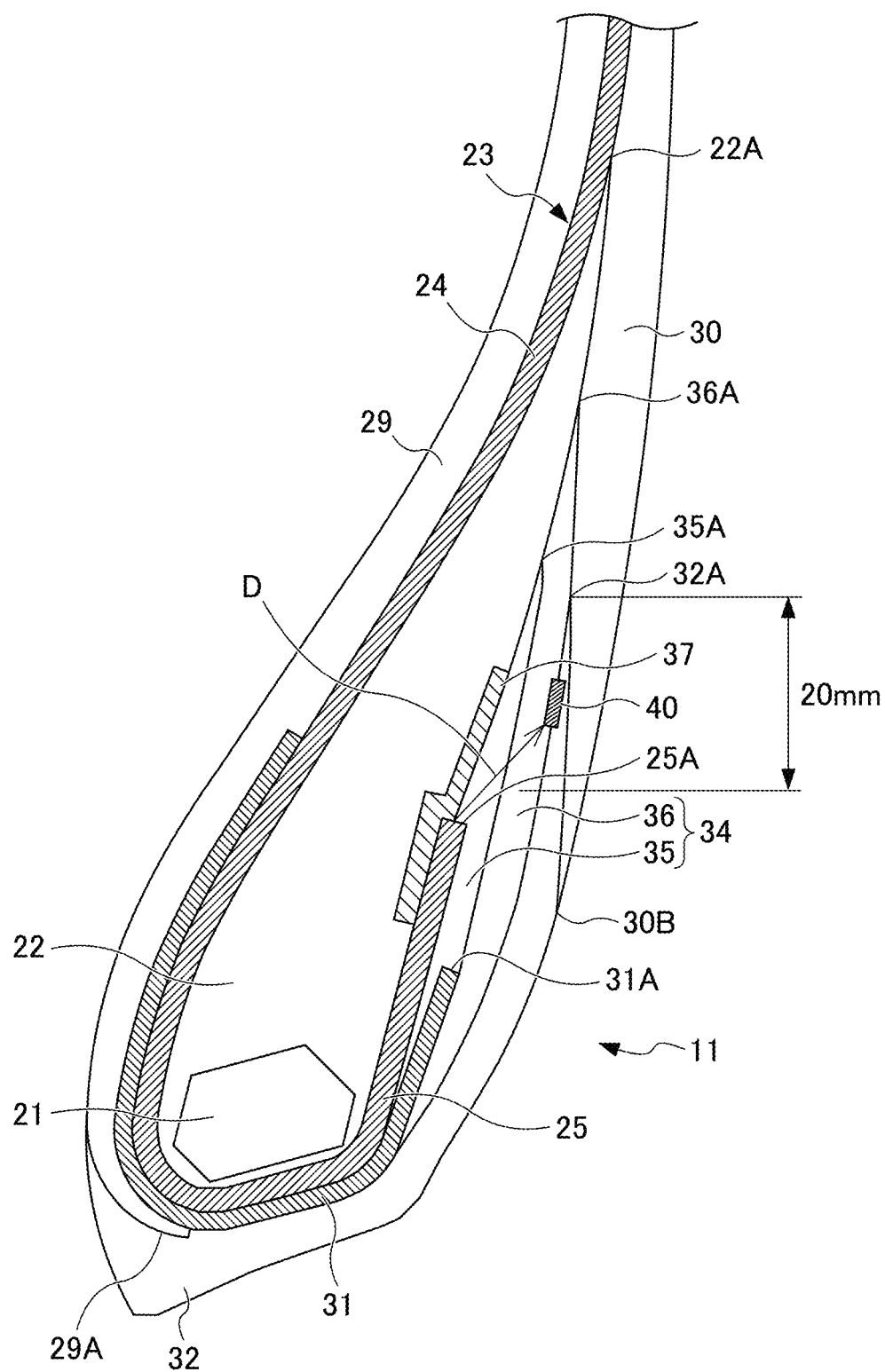
FIG. 2 is a partial enlarged cross-sectional view of the tire according to the embodiment of the present invention.

Hereinafter, a first embodiment of the present invention will be explained while referencing the drawings. FIG. 1 is a view showing a half section in a tire-width direction of a tire 1 according to the present embodiment. FIG. 2 is an enlarged cross-sectional view of a portion on the inner side in the tire-radial direction of the tire 1 in FIG. 1. Generally, the basic structure of the tire is left/right symmetric in the cross section of the tire-width direction; therefore, a cross-sectional view of the right half is shown herein. In the drawings, the reference symbol S1 is the tire equatorial plane. The tire equatorial plane S1 is a plane orthogonal to the tire rotation axis, and is positioned in the center of the tire-width direction.

Herein, tire-width direction is a direction parallel to the tire rotation axis, and is the left/right direction of the paper plane of the cross-sectional view in FIG. 1. In FIG. 1, it is illustrated as the tire-width direction X. Then, inner-side of tire-width direction is a direction approaching the tire equatorial plane S1, and is the left side of the paper plane in FIG. 1. Outer side of tire-width direction is a direction distancing from the tire equatorial plane S1, and is the right side of the paper plane in FIG. 1. In addition, tire-radial direction is a direction perpendicular to the tire rotation axis, and is the vertical direction in the paper plane of FIG. 1. In FIG. 1, it is illustrated as the tire-radial direction Y. Then, outer-side of tire-radial direction is a direction distancing from the tire rotation axis, and is the upper side of the paper plane in FIG. 1. Inner-side of tire-radial direction is a direction approaching the tire rotation axis, and is the lower side of the paper plane in FIG. 1. The same also applies to FIGS. 2 and 5.

The tire 1 is a tire for trucks and buses, for example, and includes a pair of beads 11 provided at both sides in the tire width direction, tread 12 forming a contact patch with the road surface, and a pair of sidewalls 13 which extends between the pair of beads 11 and the tread 12.

The bead 11 includes an annular bead core 21 formed by wrapping around several times bead wires made of metal coated with rubber, and a bead filler 22 of tapered shape extending to the outer side in the tire-radial direction of the bead core 21. The bead core 21 is a member which plays a role of fixing a tire 1 filled with air to the rim of a wheel which is not illustrated. The bead filler 22 is a member provided in order to raise the rigidity of the peripheral part of the bead 11 and to ensure high maneuverability and stability.

A carcass ply 23 constituting a ply serving as the skeleton of the tire is embedded inside of the tire 1. The carcass ply 23 extends from one bead core 21 to the other bead core 21. In other words, the carcass ply 23 is embedded in the tire 1 between the pair of bead cores 21, in a form passing through the pair of side walls 13 and the tread 12.

As shown in FIG. 1, the carcass ply 23 includes a ply body 24 which extends from one bead core 21 to the other bead core 21, and extends between the tread 12 and bead 11, and a ply folding part 25 which is folded around the bead core 21. Herein, a folding end 25A of the ply folding part 25 is positioned more to an inner side in the tire-radial direction than a tire-radial direction outside end 22A of the bead filler 22.

The carcass ply 23 is configured by a plurality of ply cords extending in a tire-width direction. In addition, a plurality of ply cords is arranged side by side in a tire circumferential direction. This ply cord is configured by a metal steel cord, or an insulated organic fiber cord such as polyester or polyamide, or the like, and is covered by rubber.

In the tread 12, a plurality of layers of steel belts 26 is provided in the outer side in the tire radial direction of the carcass ply 23. The steel belt 26 is configured by a plurality of steel cords covered by rubber. By providing the steel belts 26, the rigidity of the tire is ensured, and the contact state of the road surface with the tread 12 improves. In the present embodiment, although four layers of steel belts 26 are provided, the number of layered steel belt 26 is not limited thereto.

The tread rubber 28 is provided at the outer side in the tire-radial direction of the steel belt 26. A tread pattern 28A is provided to the outer surface of the tread rubber 28. The outer surface of the tread rubber 28 serves as a contact surface which contacts with the road surface.

In the vicinity of the outer side in the tire-width direction of the tread 12, in a region between the carcass ply 23, and the steel belts 26/tread rubber 28, a shoulder pad 38 is provided. The shoulder pad 38 extends until a region of the outer side in the tire-radial direction of the side wall 13, and part thereof forms an interface between side wall rubber 30 described later. In other words, in the region of the outer side in the tire-radial direction of the side wall 13, a part of the shoulder pad 38 is present on the inner side in the tire width direction of the side wall rubber 30.

The shoulder pad 38 consists of a rubber member having cushioning, and exhibits a cushion function between the carcass ply 23 and steel belt 26. In addition, since the shoulder pad 38 consists of rubber having a characteristic of low heat buildup, it is possible to suppress heat generation effectively, by extending until the side wall 13.

In the bead 11, side wall 13 and tread 12, an inner liner 29 serving as a rubber layer constituting an inside wall surface of the tire 1 is provided to a tire inner cavity side of the carcass ply 23. The inner liner 29 is configured by air permeation resistant rubber, whereby the air inside the tire inner cavity is prevented from leaking to outside.

In the side wall 13, the side wall rubber 30 constituting the outer wall surface of the tire 1 is provided to the outer side in the tire-width direction of the carcass ply 23. This side wall rubber 30 is a portion which bends the most upon the tire 1 exhibiting a cushioning action, and usually flexible rubber having fatigue resistance is adopted therein.

On the inner side in the tire radial direction of the carcass ply 23 provided around the bead core 21 of the bead 11, a steel chafer 31 serving as a reinforcement ply is provided so as to cover at least part of the carcass ply 23.

The steel chafer 31 also extends to the outer side in the tire-width direction of the ply folding part 25 of the carcass ply 23. The end 31A on the outer side in the tire-width direction of the steel chafer 31 is positioned more to the inner side in the tire-radial direction than the folding end 25A of the carcass ply 23. The end 29A on the inner side in the tire-radial direction of the aforementioned inner liner 29 curves so as to cover a portion of a corner on the inner side in the tire-width direction of the steel chafer 31. The steel chafer 31 is a metal reinforcement layer configured by a steel cord made of metal, and is covered by rubber.

As shown in FIG. 2, the rim strip rubber 32 is provided at the inner side in the tire-radial direction of the steel chafer 31. The rim strip rubber 32 is provided in a form such that covers the bead core 21 from the inner side in the tire-radial direction. The rim strip rubber 32 covers the end 29A on the inner side in the tire-radial direction of the inner liner 29. The rim strip rubber 32 is arranged along the outer surface of the tire, and connects with the side-wall rubber 30. The rim strip rubber 32 and side-wall rubber 30 are rubber members constituting the outer surface of the tire.

Then, at the outer side in the tire-radial direction of the end part 31A of the steel chafer 31, which is at the outer side in the tire-width direction of the folding part 25 of the carcass ply 23 and bead filler 22, a first pad 35 is provided. The first pad 35 is provided to the outer side in the tire-width direction of at least the folding end 25A of the carcass ply 23. The outer side in the tire-radial direction of the first pad 35 is formed so as to taper as approaching the outer side in the tire-radial direction. The first pad 35 has a portion with a thickness of at least 2 mm. The first pad 35 has non-uniform thickness. The cross-sectional shape of the first pad 35 has thick places and thin places.

Furthermore, a second pad 36 is provided so as to cover the outer side in the tire-width direction of the first pad 35. In more detail, the second pad 36 is provided so as to cover the outer side in the tire-width direction of part of the steel chafer 31, the first pad 35, and part of the bead filler 22. The outer side in the tire-radial direction of the second pad 36 is formed so as to taper as approaching the outer side in the tire-radial direction. In addition, the inner side in the tire-radial direction of the second pad 36 is formed so as to taper as approaching the inner side in the tire-radial direction. The position of the tire-radial direction outside end 36A of the second pad 36 is positioned more to the outer side in the tire-radial direction than the position of the tire-radial direction outside end 35A of the first pad 35. The second pad 36 has a portion with a thickness of at least 2 mm. The second pad 36 has a non-uniform thickness. The cross-sectional shape of the second pad 36 has a thick place and a thin place.

Then, the side-wall rubber 30 is arranged at the outer side in the tire-width direction in a region of the outer side in the tire-radial direction of the second pad 36, and the rim strip rubber 32 is arranged at an outer side in the tire-width direction in a region on the inner side in the tire-radial direction of the second pad 36. In other words, the side-wall rubber 30 covers a part on the outer side in the tire-width direction of the rim strip rubber 32 and a part on the outer side in the tire-width direction of the second pad 36.

The first pad 35 and second pad 36 configure a pad member 34, and this pad member 34 is configured from rubber of modulus equal or higher than the modulus of the bead filler 22. In more detail, the second pad 36 is configured by rubber of equal to or higher modulus than the bead filler 22, and the first pad 35 is configured by rubber of even higher modulus than the second pad 36. The first pad 35 and second pad 36 have a function of mitigating sudden distortion caused by the local rigidity point of change at the folding end 25A of the carcass ply 23 and the end part 31A of the steel chafer 31.

The rubber sheet 37 serving as a reinforced rubber sheet is arranged in the vicinity of the folding end 25A of the carcass ply 23, between the bead filler 22 and pad member 34. The rubber sheet 37 is arranged so as to cover the folding end 25A of the carcass ply 23 from the inner side in the tire-width direction. The rubber sheet 37 is configured from rubber of higher modulus than the bead filler 22. More preferably, it is configured from rubber of a modulus substantially equal to that of the first pad 35.

Generally, at the folding end 25A of the carcass ply 23, stress tends to concentrate. However, by providing the rubber sheet 37 serving as the aforementioned reinforced rubber sheet, it becomes possible to effectively suppress the concentration of stress. It should be noted that the rubber sheet 37 preferably adopts a form arranged so as to cover the folding end 25A of the carcass ply 23 from the inner side in the tire-width direction as shown in FIG. 2; however, a configuration covering the folding end 25A of the carcass ply 23 from the outer side in the tire-width direction may be adopted. Even in this case, it is possible to mitigate the concentration of stress. The rubber sheet 37 is a sheet having a thickness of no more than 2 mm. The rubber sheet 37 has a constant thickness. The rubber sheet 37 has a cross-sectional shape prior to pasting which is a rectangular shape.

Herein, when explaining by rearranging the relationship between the rim strip rubber 32 and the members at the circumference thereof, the rim strip rubber 32 is arranged at least at the tire-width direction outer side of the ply folding part 25 of the carcass ply 23 folded back around the bead core 21. In the present embodiment, the rim strip rubber 32 covers a part of the tire-width direction outer side of the pad member 34 arranged at the outer side in the tire-width direction of the folding part 25 of the carcass ply 23. In addition, the rim strip rubber 32 covers the end 29A on the inner side in the tire-radial direction of the inner liner 29 covering a portion of a corner on the inner side in the tire-width direction of the steel chafer 31. Then, the sidewall rubber 30 covers a part on the outer side in the tire-width direction of the rim strip rubber 32, and a part on the outer side in the tire-width direction of the pad member 34. By providing such a pad member 34, it is possible to effectively suppress concentration of stress, at the periphery of a connecting part of the rim strip rubber 32 and side-wall rubber 30.

Herein, when discussing the modulus of each rubber element, if establishing the modulus of the second pad 36 as a reference, the side-wall rubber 30 is preferably established with a modulus of 0.4 to 0.7 times that of the second pad 36. In addition, the first pad 35 is preferably established with a modulus of 1.0 to 1.2 times that of the second pad 36. Then, if establishing the modulus of the second pad 36 as a reference, the rim strip rubber 32 is preferably established with a modulus of 0.8 to 1.2 times that of the second pad 36. By establishing as such a modulus, it is possible to keep a balance of flexibility as a tire and rigidity in the vicinity of the bead 11. It should be noted that the modulus indicates 100% elongation modulus (M100) under a 23° C. atmosphere, measured in accordance with "3.7 stress at a given elongation, S" of JIS K6251:2010.

As shown in FIG. 2, the RFID tag 40 as an electronic component is embedded in the tire 1 of the present embodiment.

Figure 3A:
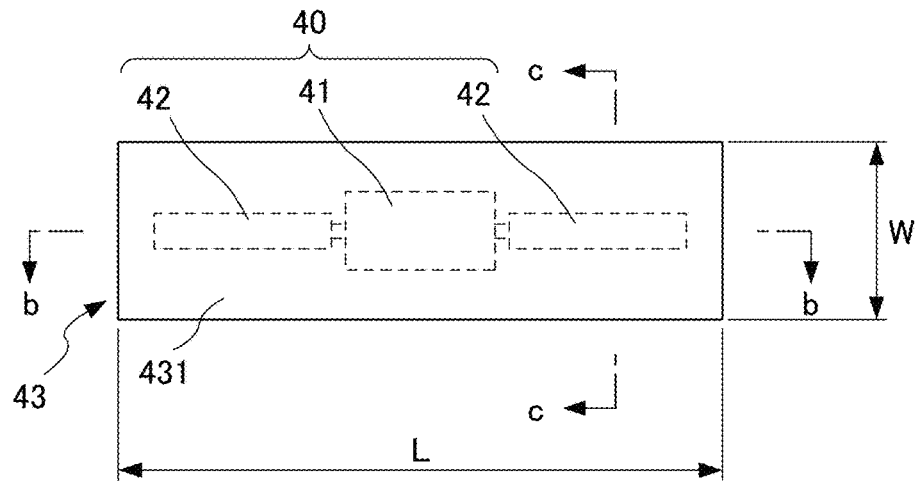
FIG. 3A is a view showing an RFID tag protected by a protective member, equipped to the tire according to the embodiment of the present invention.
Figure 3B:
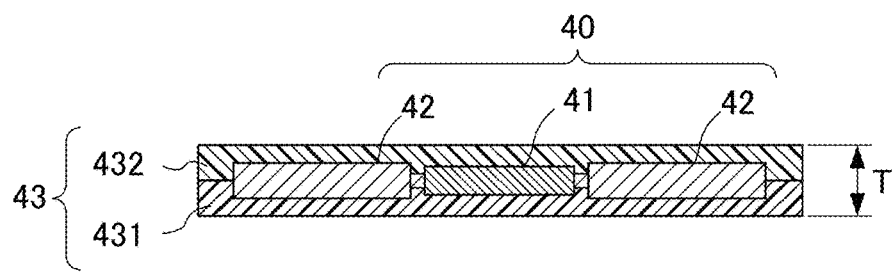
FIG. 3B is a view showing a cross section along the line b-b in FIG. 3A.
Figure 3C:
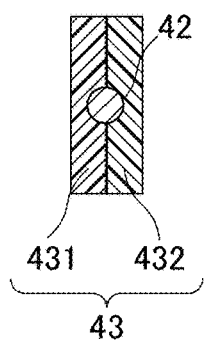
FIG. 3C is a view showing a cross section along the line c-c in FIG. 3A.

FIG. 3A shows an example of the RFID tag 40 according to the present embodiment. The RFID tag 40 is covered by the protective member 43. In FIG. 3A, the RFID tag 40 is covered and hidden by the coating rubber sheet 431 configuring the protective member 43. FIG. 3B is a cross-sectional view along the line b-b in FIG. 3A, and FIG. 3C is a cross-sectional view along the line c-c in FIG. 3A. In the present embodiment, as shown in FIGS. 3A to 3C, the RFID tag 40 is covered by the coating rubber sheets 431, 432 configuring the protective member 43.

The RFID tag 40 is a passive-type transponder equipped with an RFID chip 41, and a plurality of antennas 42 for performing communication with external equipment. The RFID tag 40 performs wireless communication with a reader (not illustrated) as the external equipment. In a storage part inside the RFID chip 41, identification information such as a manufacturing number and part number is stored.

As the antenna 42, a coil-shaped spring antenna, plate-shaped antenna, and various types of rod-shaped antennas can be used. In addition, it may be an antenna formed by printing a predetermined pattern on a flexible substrate. When considering the communicability and flexibility, a coil-shaped spring antenna is the most preferable as the antenna 42. The antenna 42 is set to the optimized antenna length according to the frequency band, etc. used.

The protective member 43 is configured from two coating rubber sheets 431, 432 which interpose and protect the RFID tag 40.

As shown in FIGS. 3A to 3C, the RFID tag 40 according to the present embodiment has a structure in which two thin pin-shaped antennas 42 extend mostly concentrically at both sides of the RFID chip 41. For this reason, the RFID tag 40 has a longitudinal direction which is long in the extending direction of the two antennas 42. The protective member 43 has a thin band-like shape which generally follows the shape of the RFID tag 40.

As shown in FIGS. 1 and 2, the RFID tag 40 is embedded between the second pad 36 an rim strip rubber 32. In the present embodiment, the RFID tag 40 is embedded between the second pad 36 and rim strip rubber 32, at a position neighboring the tire-radial direction outside end 32A of the rim strip rubber 32, and covered by the end 30B on the inner side in the tire-radial direction of the side-wall rubber 30.

The RFID tag 40 is preferably embedded between the second pad 36 and rim strip rubber 32, so that the longitudinal direction thereof becomes the direction of the tangential line relative to the circumferential direction of the tire 1, i.e. direction orthogonal to the paper plane of the cross-sectional view of FIGS. 1 and 2. By embedding in this way, also when the tire 1 is mounted to a vehicle wheel and a load is exerted to deform the tire 1, the stress from this load hardly acts on the RFID tag 40. The RFID tag 40 includes the RFID chip 41, and antenna 42 extending linearly from the RFID chip 41 to both side of the RFID chip 41, and a central axis of the antenna 42 overlaps with the RFID chip 41.

As the rubber employed in the protective member 43 covering the RFID tag 40, rubber having a modulus equivalent to at least the second pad 36 or a lower modulus is used. For example, as rubber which can be used in the protective member 43, if establishing the modulus of the second pad 36 as a reference, it is preferable to use rubber with a modulus of 0.7 to 1.1 times that.

By being covered by the coating rubber sheet (431, 432) constituting the protective member 43 in this way, the RFID tag 40 hardly receives direct stress generated during deformation of the tire 1, and for this reason, deforming and breaking are suppressed and communication performance is maintained.

Figure 4:
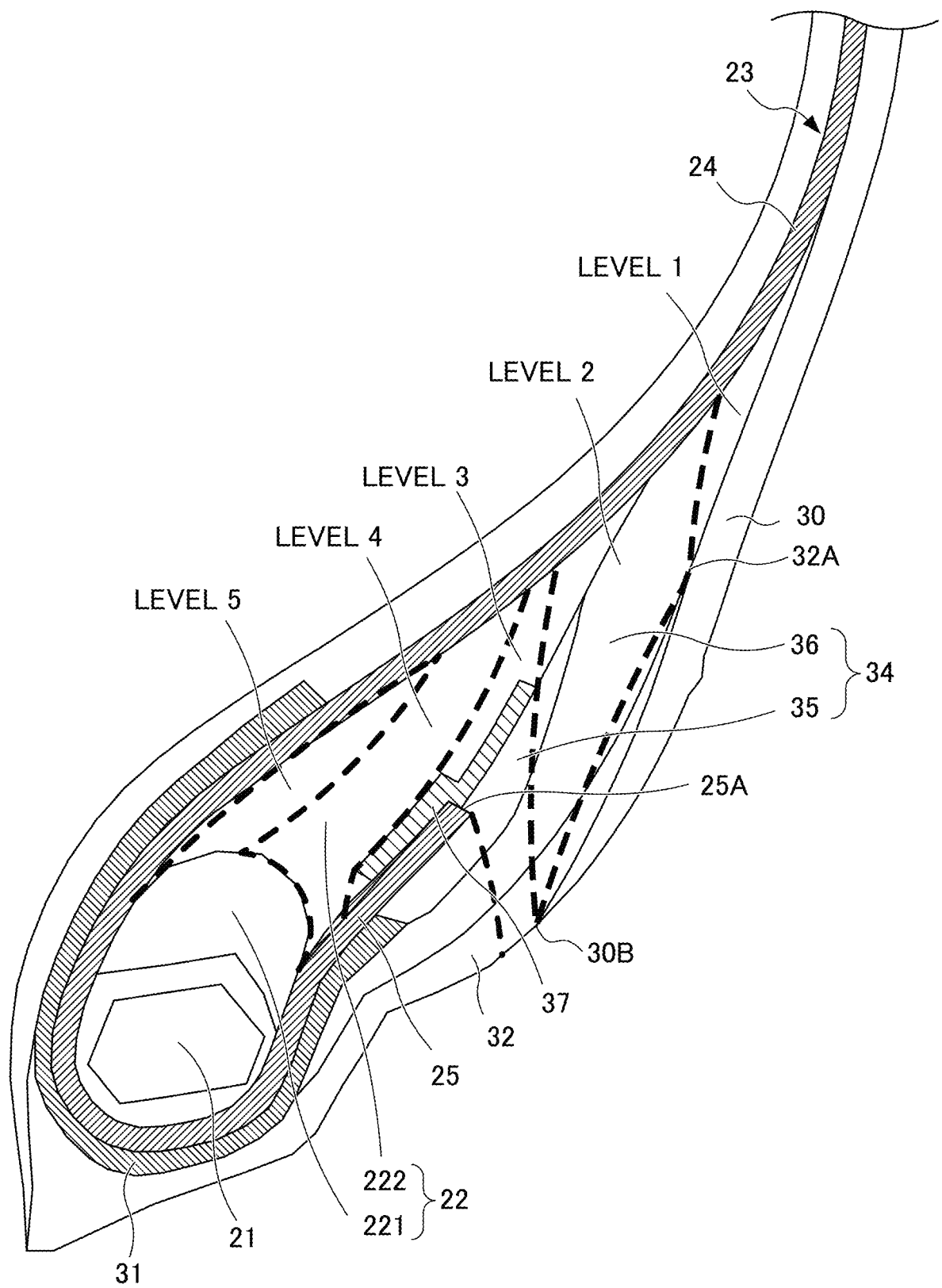
FIG. 4 is a view showing the results of in-plane distribution simulation of strain energy, in a case of applying load on a tire including a structure resembling the tire of the embodiment of the present invention.

FIG. 4 is an enlarged cross-sectional view showing the results of in-plane distribution simulation of strain energy, in a case of assembling the tire including the rubber structure resembling the rubber structure of the tire 1 according to the present embodiment to a rim, and applying 100% load. In FIG. 4, the same reference symbol is attached to constituent elements identical to the tire 1 according to the present embodiment shown in FIGS. 1 and 2.

It should be noted that, in the tire shown in FIG. 4, the bead filler 22 is configured from a first bead filler 221 covering an outer circumference of the bead core 21, and a second bead filler 222 arranged at the outer side in the tire-radial direction of the first bead filler 221. The second bead filler 222 is configured from rubber of higher modulus than the inner liner 29 and side-wall rubber 30. Then, the first bead filler 221 is configured from rubber of even higher modulus than the second bead filler 222.

FIG. 4 displays by dividing the region in five, according to the magnitude of the strain energy. Herein, a region having the highest strain energy is defined as level 5, a region having high strain energy is defined as level 4, a region in which the strain energy somewhat declined is defined as level 3, a region in which the strain energy further declined is defined as level 2, and the region in which the strain energy declined the most is defined as level 1. FIG. 4 displays by dividing the regions with bold dotted lines as the boundary.

At the boundary surface between the second pad 36 and rim strip rubber 32, an outer side in the tire-radial direction becomes a region of mostly level 1, and is a region having low strain energy, and thus is preferable upon arranging the RFID tag 40. For example, when comparing with a case of the RFID tag being embedded in the region of level 3 of the tire shown in FIG. 4, the results of the shear strain value decreasing by on the order of 15% is obtained by simulation. Due to being embedded at a position at which distortion hardly concentrates in this way, an improvement in the durability of the RFID tag 40 is achieved. In addition, the region of level 1 is on the outer side in the tire-width direction, and neighbors the side-wall 13; therefore, sufficient communication performance is exhibited.

Herein, the RFID tag 40 is installed prior to the vulcanization step in the manufacturing process of the tire. In the present embodiment, the RFID tag 40 is installed at a portion corresponding to the position shown in FIG. 2 of the second pad 36 or rim strip rubber 32 prior to being vulcanized. At this time, since the second pad 36 and rim strip rubber 32 are in the raw rubber state prior to vulcanization, the RFID tag 40 may be pasted to the second pad 36 or rim strip rubber 32 using the adhesiveness thereof. Alternatively, in the case of the adhesiveness being low or the like, it may be pasted using an adhesive or the like. After pasting the RFID tag 40, the RFID tag 40 is interposed by the second pad 36 and rim strip rubber 32. Subsequently, a green tire assembled through a molding process of turn up which folds back each constituent member including the RFID tag 40 and at least the first pad 35, second pad 36, rim strip rubber 32 and side-wall rubber 30 so as to surround the bead core 21 and bead filler 22 at the end on the inner side in the tire-radial direction, is vulcanized in a vulcanization process to manufacture the tire 1.

In the tire 1 according to the present embodiment, the first pad 35 and second pad 36 are arranged as a two-layer rubber member between the RFID tag 40 and ply folding part 25 of the carcass ply 23. For this reason, even if deformation occurs in the first pad 35 by the ply folding part 25 in the aforementioned turn-up process, for example, the stress from this deformation is mitigated by the second pad 36 and hardly acts on the RFID tag 40. The RFID tag 40 hardly moves and is retained at a set position, a result of which an improvement in layout precision of the RFID tag 40 is thereby achieved. In addition, by the position of the RFID tag 40 being retained in this way, a gap hardly occurs between the second pad 36 and rim strip rubber 32, or the occurring gap is small. For this reason, rubber flows into this gap during vulcanization, and the shape of the second pad 36 and/or rim strip rubber 32 is suppressed from deforming.

The manufacturing method of the tire 1 according to the present embodiment includes: a step of interposing the RFID tag 40 between the second pad 36 and rim strip rubber 32; and a step of folding back the RFID tag 40 and each constituent member including at least the first pad 35, second pad 36, rim strip rubber 32 and side-wall rubber 30 so as to surround the bead core 21 and bead filler 22, as mentioned above. It is thereby possible to arrange the RFID tag 40 so as to hardly receive influence from the carcass ply 23.

In the present embodiment, the position of the tire-radial direction outside end 36A of the second pad 36 is located more to the outer side in the tire-radial direction than the position of the tire-radial direction outside end 35A of the first pad 35. The first pad 35 is held down to the second pad 36 during the aforementioned molding step of the tire 1 and deformation is suppressed, a result of which the RFID tag 40 comes to even more hardly move, and it is thereby possible to effectively obtain an improvement in layout precision.

In addition, in the present embodiment, the side-wall rubber 30 covers part on the outer side in the tire-width direction of the rim strip rubber 32 and part on the outer side in the tire-width direction of the second pad 36. Since the boundary between the second pad 36 and rim strip rubber 32 is covered by the side-wall rubber 30, the position of the RFID tag 40 embedded at the boundary surface between the rim strip rubber 32 and second pad 36 is strongly retained.

The RFID tag 40 according to the present embodiment is preferably arranged in the following such predetermined region at the boundary surface between the second pad 36 and rim strip rubber 32.

As shown in FIG. 2, for the RFID tag 40, the distance from the folding end 25A of the ply folding part 25 of the carcass ply 23 is set to at least 5 mm. In other words, the RFID tag 40 is arranged at a position distanced at least 5 mm from the folding end 25A. For example, the distance D is specifically set on the order of 15 mm. Since the RFID tag 40 comes to even more hardly receive the influence from the carcass ply 23 during the aforementioned molding step of the tire 1, it is thereby possible to more effectively obtain an improvement in layout precision. In addition, in the case of the carcass ply 23 being made of metal, there is a possibility of the communication performance declining if the RFID tag 40 makes contact with the carcass ply 23; however, communication performance is maintained by the distance D being secure at 5 mm or greater. It should be noted that the distance D is secured at 5 mm or greater in the tire 1 after molding. Therefore, at a stage before molding, the position of the RFID tag 40 is adjusted so that the distance D after molding is secured at 5 mm or greater.

As shown in FIG. 2, the RFID tag 40 is arranged in a region from the tire-radial direction outside end 32A of the rim strip rubber 32 until 20 mm to the inner side in the tire-radial direction. The RFID tag 40 is thereby embedded at a position at which distortion hardly concentrates; therefore, an improvement in durability is achieved. It should be noted, as a specific example, the RFID tag 40 is arranged with a distance on the order of 10 mm from the tire-radial direction outside end 32A of the rim strip rubber 32 to the inner side in the tire-radial direction. It should be noted that, for the RFID tag 40, as shown in FIG. 2, the entirety thereof may be arranged in a region from the tire-radial direction outside end 32A of the rim strip rubber 32 until 20 mm to the inner side in the tire-radial direction, and at least a part thereof may be arranged in this region. In addition, in the case of the RFID tag 40 being covered by the coating rubber sheets 431, 432 constituting the protective member 43 as in the present embodiment, the entirety of the coating rubber sheets 431, 432 may be arranged in a region from the tire-radial direction outside end 32A of the rim strip rubber 32 until 20 mm to the inner side in the tire-radial direction.

According to the tire 1 according to the present embodiment explained above, the following effects are exerted.

(1) The tire 1 according to the present embodiment includes: the pair of beads 11 having the pair of annular bead cores 21 arranged to be separated in the tire-width direction, and the bead filler 22 extending to the outer side in the tire-radial direction of the bead core 21; the carcass ply 23 which extends from the bead core 21 of one bead 11 to the bead core 21 of the other bead 11, and is folded back around each of the bead cores 21, and further includes: the first pad 35 arranged at the outer side in the tire-width direction of the folding end 25A of the carcass ply 23 which was folded back; the second pad 36 arranged on the outer side in the tire-width direction of the first pad 35; and the rim strip rubber 32 arranged at least at part on the outer side in the tire-width direction of the second pad 36, in which the RFID tag 40 is provided as an electronic component between the second pad 36 and the rim strip rubber 32.

It is thereby possible to arrange the RFID tag 40 so as to hardly receive influence from the carcass ply 23, and possible to achieve an improvement in layout precision of the RFID tag 40. In addition, due to being embedded at a position at which distortion hardly concentrates, it is possible to improve the durability of the RFID tag 40. In addition, since the RFID tag 40 is embedded at a position on the outer side in the tire-width direction and contacting the side-wall 13, sufficient communication performance of the RFID tag 40 is exhibited.

(2) In the tire 1 according to the present embodiment, the position of the tire-radial direction outside end 36A of the second pad 36 is located more to the outer side in the tire-radial direction than the position of the tire-radial direction outside end 35A of the first pad 35.

The first pad 35 is held down to the second pad 36 during the molding step of the tire 1 and deformation is suppressed, a result of which the RFID tag 40 comes to even more hardly move, and it is thereby possible to effectively obtain an improvement in layout precision.

(3) In the tire 1 according to the present embodiment, the RFID tag 40 is arranged at a position distanced by at least 5 mm from the folding end 25A of the carcass ply 23.

Since the RFID tag 40 comes to even more hardly receive the influence from the carcass ply 23 during the molding step of the tire 1, it is thereby possible to more effectively obtain an improvement in layout precision. In addition, even in the case of the carcass ply 23 being made of metal, it is possible to maintain the communication performance of the RFID tag 40.

(4) In the tire 1 according to the present embodiment, for the RFID tag 40, at least a part thereof is arranged in a region from the tire-radial direction outside end 32A of the rim strip rubber 32 until 20 mm to the inner side in the tire-radial direction.

The RFID tag 40 is thereby embedded at a position at which distortion hardly concentrates; therefore, an improvement in durability is achieved.

(5) The tire 1 according to the present embodiment includes the side-wall rubber 30, and this side-wall rubber 30 is positioned at the outer side in the tire-width direction of at least part of part on the outer side in the tire-width direction of the rim strip rubber 32, and the second pad 36.

Since the boundary between the second pad 36 and rim strip rubber 32 is covered by the side-wall rubber 30, it is thereby possible to strongly retain the position of the RFID tag 40 embedded at the boundary surface between the rim strip rubber 32 and second pad 36.

(6) In the tire 1 according to the present embodiment, the RFID tag 40 is covered by the coating rubber sheets 431, 432 constituting the protective member 43.

The RFID tag 40 thereby hardly receives direct stress generated during deformation of the tire 1, and for this reason, deforming and breaking are suppressed and communication performance is maintained.

(7) In the tire 1 according to the present embodiment, if establishing the modulus of the second pad 36 as a reference, the rim strip rubber 32 is preferably established with a modulus of 0.8 to 1.2 times that of this second pad 36.

It is thereby possible to keep the balance between flexibility as a tire and rigidity in the vicinity of the bead 11.

(8) In the tire 1 according to the present embodiment, if establishing the modulus of the second pad 36 as a reference, the coating rubber sheets 431, 432 covering the RFID tag 40 is preferably rubber having a modulus of 0.7 to 1.1 times that of the second pad 36.

The RFID tag 40 thereby hardly receives direct stress generated during deformation of the tire 1, and for this reason, deforming and breaking are suppressed and communication performance is maintained.

(9) In the tire 1 according to the present embodiment, the steel chafer 31 is provided so as to cover at least part of the carcass ply 23, and the rim strip rubber 32 is provided at the inner side in the tire-radial direction of the steel chafer 31.

The carcass ply 23 is thereby reinforced by the steel chafer 31, and the steel chafer 31 is protected by the rim strip rubber 32.

Next, another embodiment of the present invention will be explained by referencing FIG. 5. It should be noted that, in the following explanation, the same reference symbols are attached for configurations which are the same as the above embodiment, explanations of these configurations are omitted, and only points of difference from the above embodiment will be explained.

Figure 5:
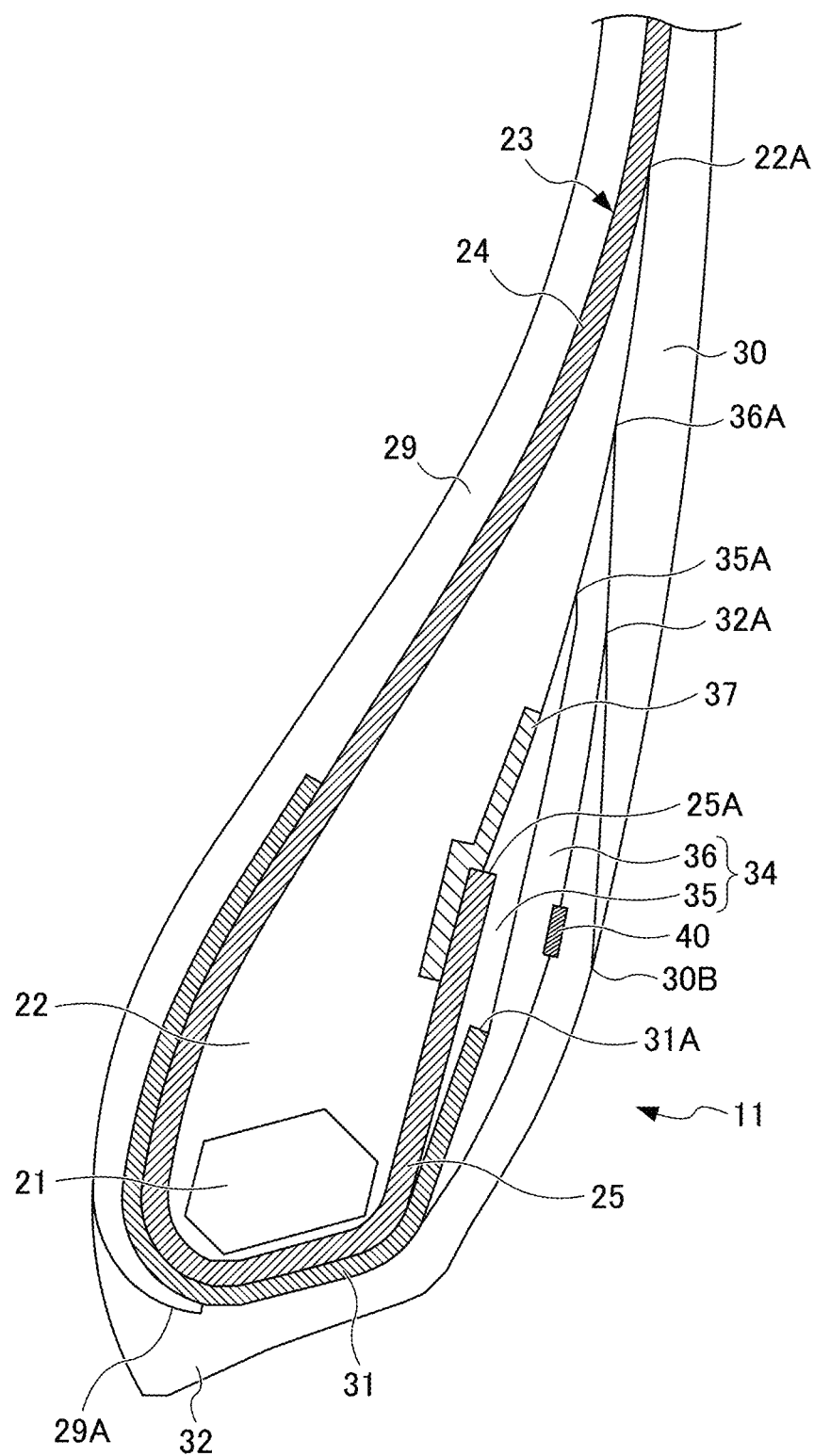
FIG. 5 is a partial enlarged cross-sectional view of a tire according to another embodiment of the present invention.

An RFID tag 40 of the other embodiment shown in FIG. 5 is arranged more to the inner side in the tire-radial direction than in the above-mentioned embodiment. This RFID tag 40 is arranged at a position almost identical to the end 30B on the inner side in the radial direction of the side-wall rubber 30 in the tire-radial direction, which is a position somewhat more to the inner side in the tire-radial direction than the folding end 25A of the ply folding part 25 of the carcass ply 23. Other than this, it is equipped with the same configuration as the above-mentioned embodiment.

Also in this embodiment, the RFID tag 40 is provided between the second pad 36 and rim strip rubber 32; therefore, the effect of the above (1) is similarly exerted. In addition, the effects of the above (2), (5) and (6) are also similarly exerted.

It should be noted that the present invention is not limited to the above-mentioned embodiments, and even if including modifications, improvements, etc. within a scope which can achieve the object of the present invention, it is also encompassed in the scope of the present invention.

For example, in the above-mentioned embodiment, the RFID tag 40 is covered by the coating rubber sheets 431, 432 constituting the protective member 43; however, it may be embedded to be sandwiched directly between the second pad 36 and rim strip rubber 32, without covering by the coating rubber sheets 431, 432.

In addition, in the embodiment, the RFID tag 40 is embedded in the tire as an electronic component; however, the electronic component according to the present invention embedded in the tire is not limited to an RFID tag. For example, it may be various electronic components, piezoelectric elements, or strain sensors such as sensors performing wireless communication. Although the tire of the present invention can be adopted as various types of tires such as for cars, light trucks, trucks and buses, it is particularly suitable as a tire of a truck, bus, etc.

(1) The tire (for example, tire 1) of the present invention includes: a pair of beads (for example, the beads 11) having a pair of annular bead cores (for example, the bead cores 21) arranged to be separated in the tire-width direction and a bead filler (for example, the bead filler 22) extending to an outer side in a tire-radial direction of the bead core; a carcass ply (for example, the carcass ply 23) extending from one of the bead cores to another of the bead cores, and folded back around each of the bead cores; a first pad (for example, the first pad 35) disposed at an outer side in a tire-width direction of a folding end (for example, the folding end 25A) of the carcass ply which is folded back; a second pad (for example, the second pad 36) disposed at an outer side in the tire-width direction of the first pad; and rim strip rubber (for example, the rim strip rubber 32) disposed at least at a part on an outer side in the tire-width direction of the second pad, in which an electronic component (for example, the RFID tag 40) is provided to interpose the second pad and the rim strip rubber.

(2) In the tire of (1), the position of the tire-radial direction outside end (for example, tire-radial direction outside end 36A) of the second pad is located more to the outer side in the tire-radial direction than the position of the tire-radial direction outside end (for example, tire-radial direction outside end 35A) of the first pad.

(3) In the tire of (1) or (2), the electronic component is arranged at a position distanced at least 5 mm from the folding end (for example, folding end 25A) of the carcass ply.

(4) In the tire of any of (1) to (3), at least part of the electronic component is arranged in a region from the tire-radial direction outside end (for example, tire-radial direction outside end 32A) of the rim strip rubber until 20 mm to the inner side in the tire-radial direction.

(5) In the tire of any of (1) to (4) further includes the side-wall rubber (for example, side-wall rubber 30), and the side-wall rubber is positioned to the outer side in the tire-width direction of at least part of the rim strip rubber and the second pad.

(6) In the tire of any of (1) to (5), the electronic component is covered by the coating rubber sheet (for example, coating rubber sheets 431, 432).

(7) In the tire of any of (1) to (6), if establishing the modulus of the second pad as a reference, the rim strip rubber has a modulus of 0.8 to 1.2 times that of this second pad.

(8) In the tire of (6), if establishing the modulus of the second pad as a reference, the coating rubber sheet has a modulus of 0.7 to 1.1 times that of this second pad.

(9) In the tire of any of (1) to (8), the steel chafer (for example, steel chafer 31) is provided so as to cover at least part of the carcass ply, and the rim strip rubber is provided at an inner side in the tire-radial direction of the steel chafer.

(10) In the tire of (9), the first pad is provided at the outer side in the tire-radial direction of the end (for example, end 31A) of the steel chafer, and at the outer side in the tire-width direction of the folding part (for example, folding part 25) of the carcass ply and the bead filler.

(11) In the tire of (9) or (10), the second pad is provided so as to cover the outer side in the tire-width direction of part of the steel chafer, the first pad, and part of the bead filler.

(12) In the tire of any of (1) to (11), the electronic component is embedded in the tire so that a longitudinal direction thereof becomes the direction of a tangential line relative to the circumferential direction of the tire.

(13) In the tire of any of (1) to (12), the electronic component includes an RFID chip (for example, RFID chip 41), and an antenna (for example, antenna 42) extending linearly from the RFID chip to both sides of the RFID chip, and a central axis of the antenna overlaps the RFID chip.

What is claimed is:

1. A tire comprising:
   a pair of beads each having annular bead cores and a bead filler extending to an outer side in a tire-radial direction of the bead core;
   a carcass ply extending from one of the bead cores to another of the bead cores, and folded back around each of the bead cores;
   a first pad disposed at an outer side in a tire-width direction of a folding end of the carcass ply;
   a second pad disposed at an outer side in the tire-width direction of the first pad; and
   a rim strip rubber disposed at least at a part on an outer side in the tire-width direction of the second pad,
   wherein:
   a steel chafer is provided so as to cover at least part of the carcass ply, and the rim strip rubber is provided at an inner side in the tire-radial direction of the steel chafer;
   an electronic component is provided to interpose the second pad and the rim strip rubber;
   the electronic component is disposed at a position distanced at least 5 mm from the folding end of the carcass ply;
   in the tire-radial direction, the entire electronic component is disposed inside a tire-radial direction outside end of the bead filler and outside the folding end of the carcass ply;
   a tire-radial direction inside end of the first pad is located between the carcass ply and the steel chafer, closer to an inner side in the tire-radial direction than a tire-radial direction outer surface of the bead core;
   a tire-radial direction outside end of the first pad is located closer to an outer side in the tire-radial direction than a tire-radial direction outside end of the rim strip rubber; and
   a tire-radial direction inside end of the second pad is located closer to an inner side in the tire-radial direction than a tire-radial direction inside end of the first pad.

2. The tire according to claim 1, wherein a position of a tire-radial direction outside end of the second pad is located closer to an outer side in the tire-radial direction than a position of the tire-radial direction outside end of the first pad.

3. The tire according to claim 2, further comprising side-wall rubber,
   wherein the side-wall rubber is located at an outer side in the tire-width direction of at least part of the rim strip rubber and the second pad.

4. The tire according to claim 1, wherein the electronic component has at least a part thereof disposed from the tire-radial direction outside end of the rim strip rubber until 20 mm to an inner side in the tire-radial direction.

5. The tire according to claim 4, further comprising side-wall rubber,
wherein the side-wall rubber is located at an outer side in the tire-width direction of at least part of the rim strip rubber and the second pad.

6. The tire according to claim 1, further comprising side-wall rubber,
wherein the side-wall rubber is located at an outer side in the tire-width direction of at least part of the rim strip rubber and the second pad.

7. The tire according to claim 1, wherein the electronic component is covered by a coating rubber sheet.

8. The tire according to claim 7, wherein, when establishing modulus of the second pad as a reference, the coating rubber sheet has a modulus of 0.7 to 1.1 times that of the second pad.

9. The tire according to claim 1, wherein, when establishing modulus of the second pad as a reference, the rim strip rubber has a modulus of 0.8 to 1.2 times that of the second pad.

10. The tire according to claim 1, wherein the first pad is provided at an outer side in the tire-radial direction of an end of the steel chafer, and an outer side in the tire-width direction of a folding part of the carcass ply and the bead filler.

11. The tire according to claim 1, wherein the second pad is provided so as to cover an outer side in the tire-width direction of part of the steel chafer, the first pad, and part of the bead filler.

12. The tire according to claim 1, wherein the electronic component is embedded in the tire so that a longitudinal direction thereof becomes a direction of a tangential line relative to a circumferential direction of the tire.

13. The tire according to claim 1, wherein the electronic component includes an RFID chip and an antenna extending linearly from the RFID chip to both sides of the RFID chip, wherein a central axis of the antenna overlaps the RFID chip.

14. A tire comprising:
a pair of beads each having annular bead cores and a bead filler extending to an outer side in a tire-radial direction of the bead core;
a carcass ply extending from one of the bead cores to another of the bead cores, and folded back around each of the bead cores;
a first pad disposed at an outer side in a tire-width direction of a folding end of the carcass ply;
a second pad disposed at an outer side in the tire-width direction of the first pad;
a rim strip rubber disposed at least at a part on an outer side in the tire-width direction of the second pad, and
a steel chafer is provided so as to cover at least part of the carcass ply, and the rim strip rubber is provided at an inner side in the tire-radial direction of the steel chafer;
a side-wall rubber located at an outer side in the tire-width direction of at least part of the rim strip rubber and the second pad,
wherein an electronic component is provided to interpose the second pad and the rim strip rubber;
the electronic component is disposed at a position distanced at least 5 mm from the folding end of the carcass ply and inward of the folding end of the carcass ply in the tire-radial direction,
a tire-radial direction inside end of the first pad is located between the carcass ply and the steel chafer, closer to an inner side in the tire-radial direction than a tire-radial direction outer surface of the bead core;
a tire-radial direction outside end of the first pad is located closer to an outer side in the tire-radial direction than a tire-radial direction outside end of the rim strip rubber;
a tire-radial direction inside end of the second pad is located closer to an inner side in the tire-radial direction than a tire-radial direction inside end of the first pad, and
a tire-width direction inner surface of the electronic component is disposed, in order, proximate the second pad, first pad, and carcass ply toward an inner side in the tire-width direction.

15. The tire according to claim 14, wherein a tire-radial direction inner surface of the electronic component is disposed at a same tire-radial direction height as a tire-radial direction inside end of the side-wall rubber.

* * * * *